US006588368B1

United States Patent
Cheng

(10) Patent No.: US 6,588,368 B1
(45) Date of Patent: Jul. 8, 2003

(54) SPOUT STRUCTURE OF A PET FOUNTAIN

(76) Inventor: Chen Hui Cheng, No. 172, Lun-Mei Rd., Chang Hua City, Chang Hua Hsien (TW)

( * ) Notice: Subject to any disclaimer, the term of this patent is extended or adjusted under 35 U.S.C. 154(b) by 0 days.

(21) Appl. No.: 10/270,211

(22) Filed: Oct. 15, 2002

(51) Int. Cl.⁷ .......................... A01K 7/00; A01K 39/00
(52) U.S. Cl. ........................ 119/51.03; 119/72; 119/75
(58) Field of Search .................. 119/51.03, 72, 119/74, 75; 137/15.22, 45

(56) References Cited

U.S. PATENT DOCUMENTS

| | | | | |
|---|---|---|---|---|
| 3,771,496 A | * | 11/1973 | Atchley | 119/72.5 |
| 4,660,509 A | * | 4/1987 | Steudler, Jr. | 119/72.5 |
| 5,720,239 A | * | 2/1998 | Thomson | 119/74 |
| 5,924,678 A | * | 7/1999 | Olde | 119/75 |
| 5,934,222 A | * | 8/1999 | Hwang | 119/72 |
| 6,332,428 B1 | * | 12/2001 | Li et al. | 119/75 |

* cited by examiner

*Primary Examiner*—Charles T. Jordan
*Assistant Examiner*—Elizabeth Shaw
(74) *Attorney, Agent, or Firm*—Harrison & Egbert

(57) ABSTRACT

A drinking fountain is designed for use by a pet and is formed of water container and a spout structure. The spout structure includes a spout tube, a hollow seat, and a ball. The spout tube is in communication with the water container and is provided in the inner wall with two locating projections between which the hollow seat is located. The hollow seat is provided in the inner wall with an annular stop edge. The ball is movably disposed in the seat such that the ball is stopped and supported by the annular stop edge, and that the ball is partially exposed through the bottom end of the spout tube so as to enable the ball to be licked by the pet, thereby resulting in the passage of water through the bottom end of the spout tube.

1 Claim, 5 Drawing Sheets

SPOUT STRUCTURE OF A PET FOUNTAIN

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a drinking fountain for pet, and more particularly to a spout structure of the pet fountain.

BACKGROUND OF THE INVENTION

The conventional pet fountain comprises a water container which is provided at the bottom with a projecting tube in communication with the hollow interior of the water container. The projecting tube is used to discharge water held in the hollow interior of the water container. The projecting tube is provided at the outer end with a spout tube which is detachably fastened with the outer end of the projecting tube and is provided therein with a hollow seat and a ball located movably in the hollow seat to serve as a sealer. The ball is partially exposed through the open end of the spout tube. The ball is moved inward by the tongue of a pet, thereby allowing the passage of water. As the tongue of the pet is withdrawn from the ball, the ball falls back into place to seal off the spout tube. After a prolonged usage of the conventional pet fountain, the ball is susceptible to being clogged in the seat. As a result, the ball can not be easily moved in the seat by the act of licking with the tongue of a pet.

BRIEF SUMMARY OF THE INVENTION

The primary objective of the present invention is to provide a pet fountain which is free of the deficiency of the conventional pet fountain described above.

In keeping with the principle of the present invention, the foregoing objective of the present invention is attained by the pet fountain comprising a water container which is provided with an outlet and a spout tube fastened detachably with the outlet. The spout tube is provided therein with a hollow seat and a ball. The hollow seat is provided in the inner wall with an annular stop edge. The ball is movably located in the hollow seat such that the ball is stopped by the annular stop edge. The annular stop edge serves to support the ball so as to prevent the ball from making an excessively intimate contact with the inner wall of the hollow seat, thereby averting the obstruction of the hollow seat by the ball.

The features and the advantages of the present invention will be more readily understood upon a thoughtful deliberation of the following detailed description of the present invention with reference to the accompanying drawings.

DETAILED DESCRIPTION OF THE INVENTION

As shown in FIGS. 1–4, a drinking fountain embodied in the present invention is designed for use by pets and is formed of a water container 10 and a spout structure 20.

Figure 1:
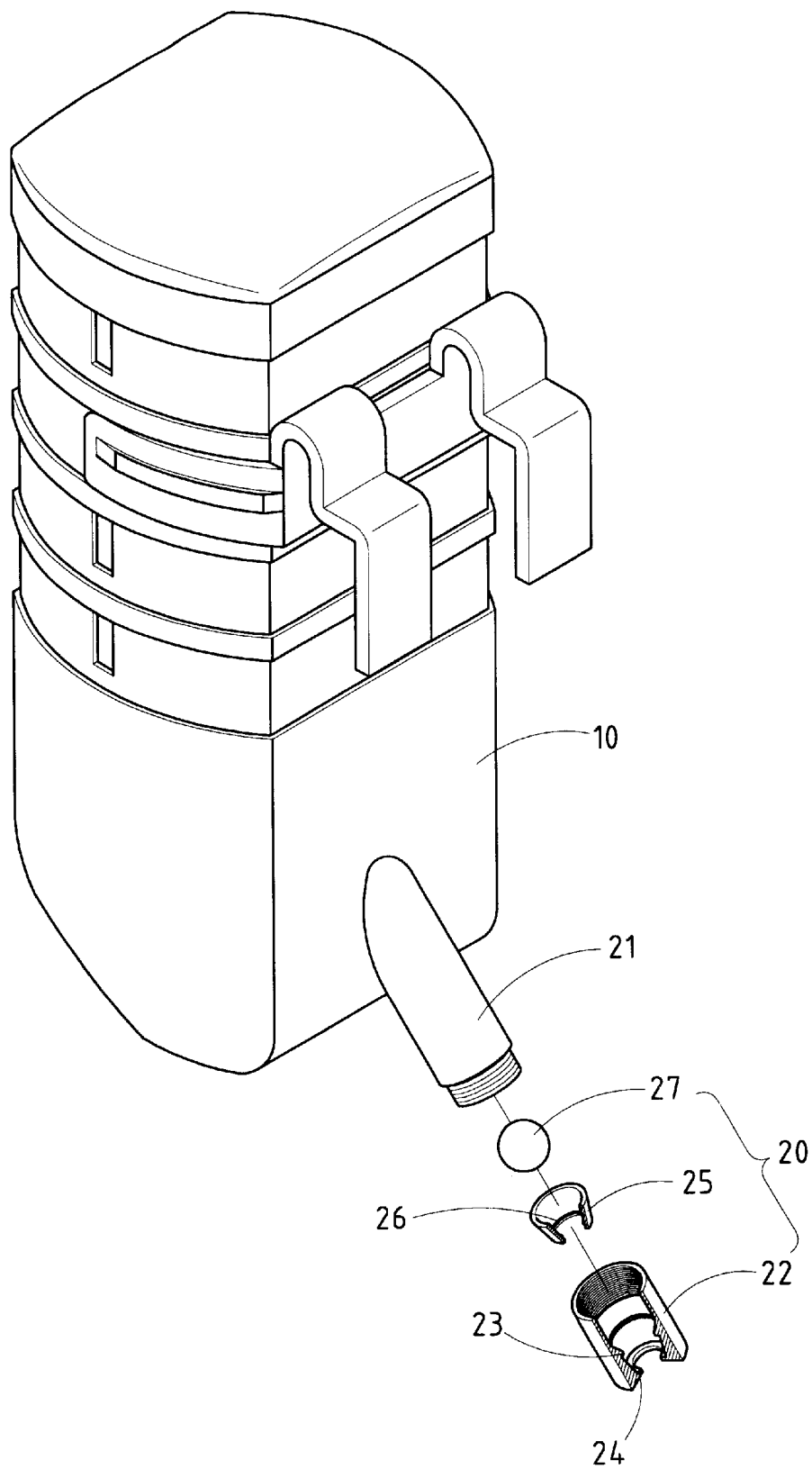
FIG. 1 shows an exploded perspective view of a spout structure of the present invention.
Figure 2:
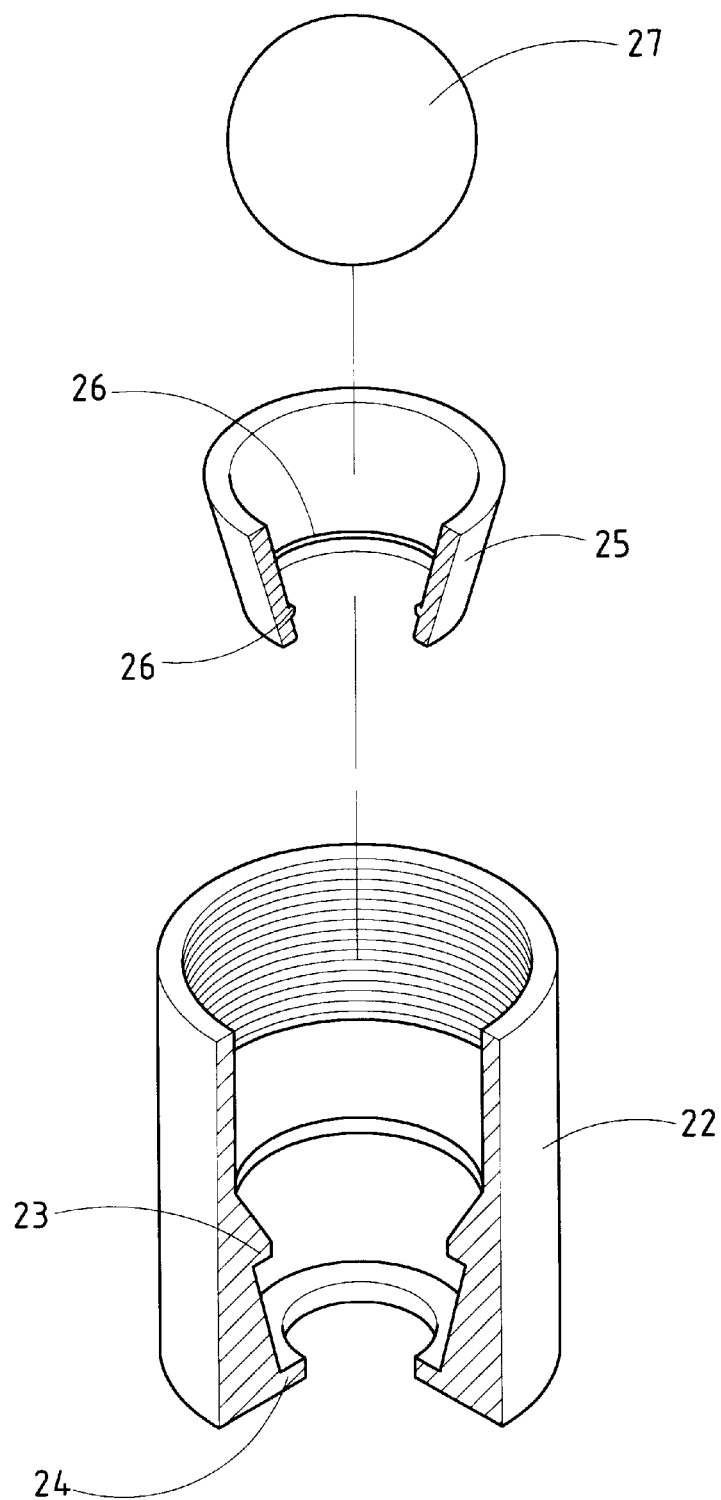
FIG. 2 shows an enlarged exploded perspective view of the spout structure of the present invention.
Figure 3:
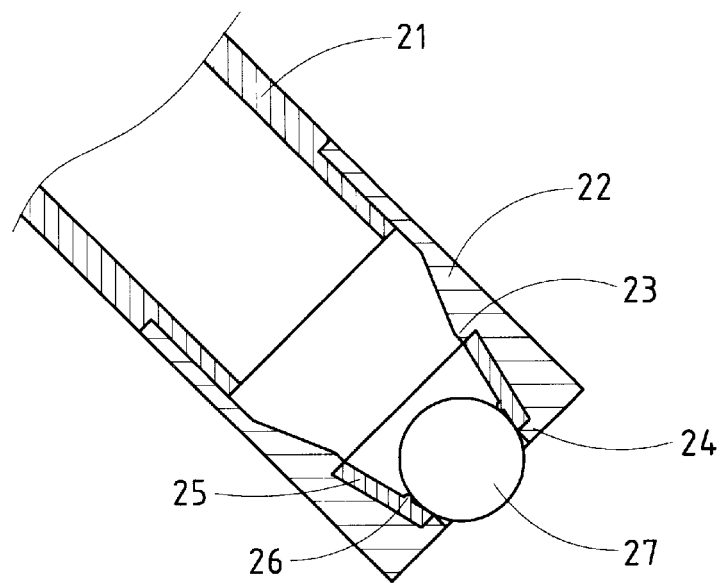
FIG. 3 shows a longitudinal sectional view of the spout structure of the present invention.

The water container 10 is provided with an outlet 21 via which the water held in the container 10 is let out. The spout structure 20 is detachably fastened at the inner end with the outer end of the outlet 21. The spout structure 20 comprises a spout tube 22, a hollow seat 25, and a ball 27, as shown in FIG. 1. The spout tube 22 is provided in the inner wall of proximity of the bottom end thereof with a first projection 23 and a second projection 24 separated from the first projection 23 by a predetermined distance. The hollow seat 25 is of a bowl-shaped construction and is open at the top and the bottom. The hollow seat 25 is disposed in the hollow interior of the spout tube 22 such that the hollow seat 25 is located between the first projection 23 and the second projection 24 of the inner wall of the spout tube 22. The hollow seat 25 is provided in the inner wall with an annular stop edge 26. The ball 27 is movably disposed in the hollow seat 25 such that the ball 27 is stopped and supported by the annular stop edge 26 of the hollow seat 25, and that the ball 27 is partially exposed through the bottom end of the spout tube 22, as shown in FIG. 3.

Figure 4:
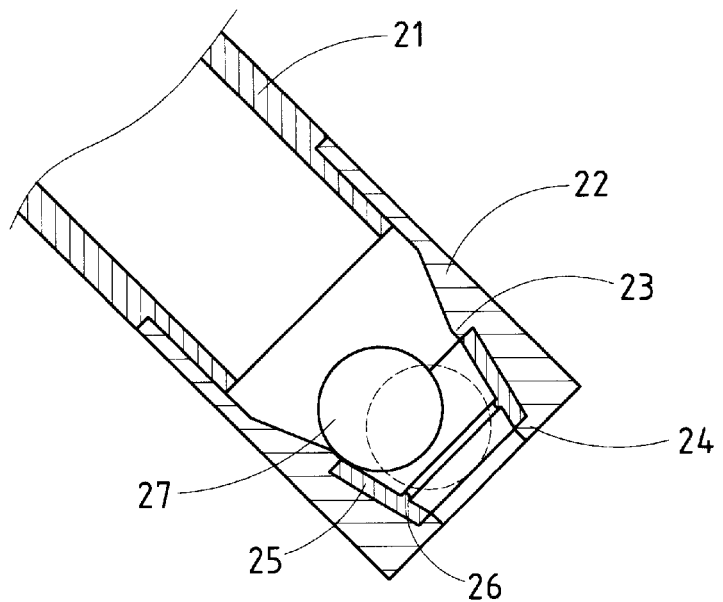
FIG. 4 shows a longitudinal sectional view of the spout structure of the present invention in action.

The pet fountain of the present invention serves to provide a pet with the drinking water in such a manner that the ball 27 is caused to move upward and away from the annular stop edge 26 of the hollow seat 25 by the act of licking with the tongue of the pet, as illustrated in FIG. 4. As a result of separation of the ball 27 from the annular stop edge 26, the water is let out. As soon as the act of licking stops, the ball 27 falls back into place, as shown in FIG. 3, thereby averting the passage of water. In another words, the ball 27 serves as a sealer. The annular stop edge 26 of the seat 25 serves to stop and support the ball 27, which is thus prevented from clogging the seat 25 and can be therefore moved around easily in the seat 25 by the tongue of a pet. As a result, the pet has an easy access to the drinking fountain of the present invention.

Figure 5:
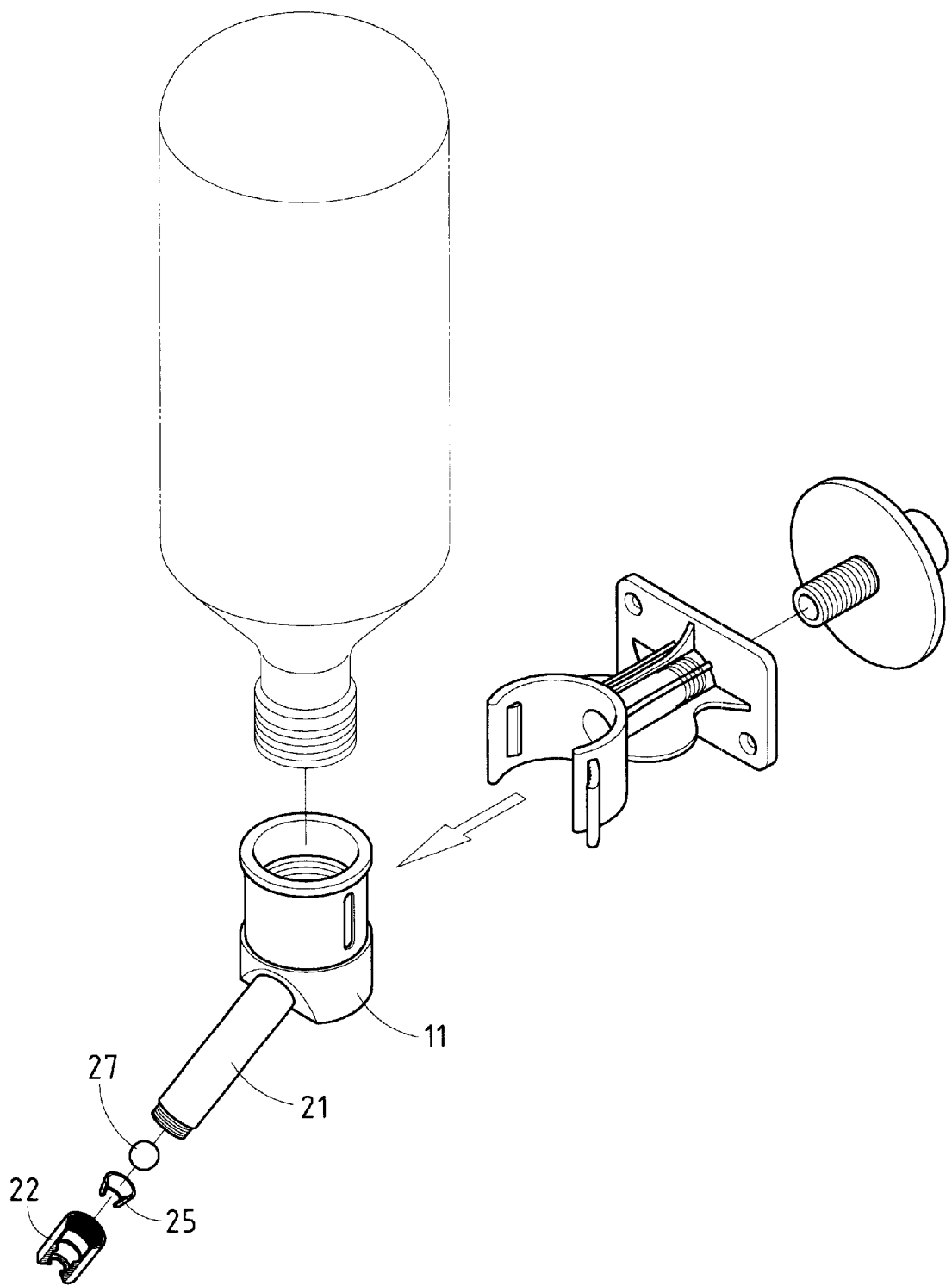
FIG. 5 shows a schematic view of another pet fountain of the present invention.
Figure 6:
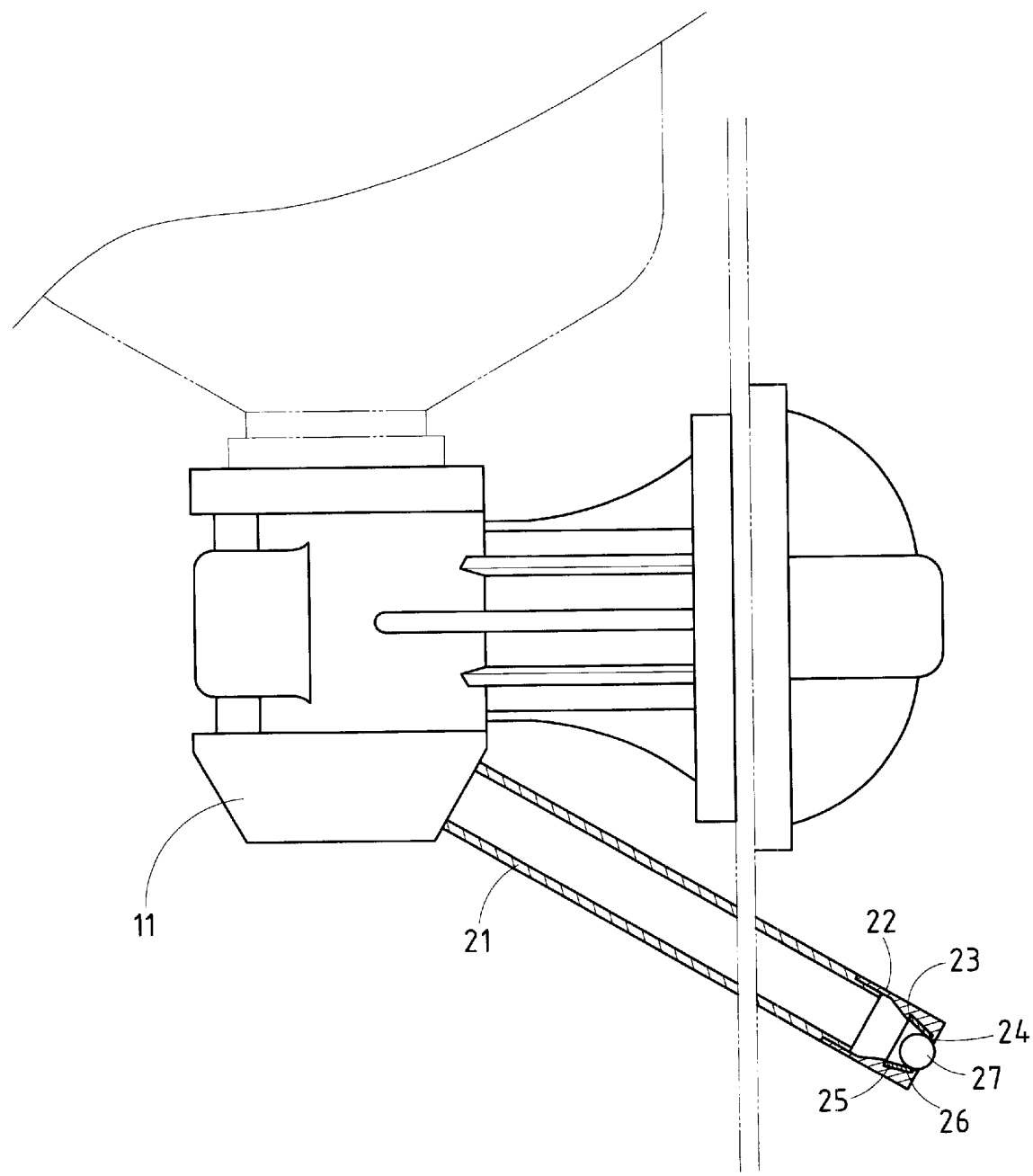
FIG. 6 shows a partial section view of the pet fountain as shown in FIG. 5.

The outlet 21 of the present invention may be separated from the container 10 and is fastened to a rotary mount 11 which is in turn fastened rotatably to the container 10, as shown in FIGS. 5 and 6.

The present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:

1. A pet fountain comprising:
   a water container comprised of an outlet; and
   a spout structure fastened detachably at a top end to said outlet of said water container and comprised of a spout tube, a hollow seat, and a ball, said spout tube being detachably fastened at a top end to said outlet of said water container and provided in the inner wall of a bottom end thereof with two locating projections which are arranged at an interval, said hollow seat comprising an open top and an open bottom and being located between said two locating projections of the bottom end of said spout tube such that the open top and the open bottom of said hollow seat are aligned with the top end and a bottom end of said spout tube, said ball being movably disposed in said hollow seat such that said ball blocks the open bottom of said hollow seat, and that said ball is partially exposed through the bottom end of said spout tube so as to enable said ball to be moved away from the open bottom of said hollow seat by the act of licking with the tongue of a pet;

wherein said hollow seat is provided in an inner wall with an annular stop edge; and wherein said ball is movably disposed in said hollow seat such that said ball is stopped and supported by said annular stop edge.

* * * * *